United States Patent [19]

Ikeda

[11] Patent Number: 4,913,516
[45] Date of Patent: Apr. 3, 1990

[54] SUBMARINE OPTICAL FIBER CABLE

[75] Inventor: Jiro Ikeda, Yokohama, Japan

[73] Assignee: Ocean Cable Co., Ltd., Japan

[21] Appl. No.: 251,843

[22] Filed: Oct. 3, 1988

[30] Foreign Application Priority Data

Jun. 24, 1988 [JP] Japan .............................. 63-82886[U]

[51] Int. Cl.$^4$ ................................................ G02B 5/14
[52] U.S. Cl. .................................. 350/96.23; 174/70 R
[58] Field of Search ..................... 350/96.23; 174/70 R

[56] References Cited

U.S. PATENT DOCUMENTS

| | | | |
|---|---|---|---|
| 4,156,104 | 5/1979 | Mondello | 174/70 R |
| 4,484,963 | 11/1984 | Anctil et al. | 350/96.23 |
| 4,538,881 | 9/1985 | Anctil et al. | 350/96.23 |
| 4,684,213 | 8/1987 | Ishihara et al. | 350/96.23 |

FOREIGN PATENT DOCUMENTS

| | | | |
|---|---|---|---|
| 0048003 | 3/1983 | Japan | 350/96.23 |
| 0053611 | 3/1986 | Japan | 350/96.23 |

*Primary Examiner*—Frank Gonzalez
*Assistant Examiner*—Akm E. Ullah
*Attorney, Agent, or Firm*—Arnold, White & Durkee

[57] ABSTRACT

The present invention relates to a submarine optical fiber cable which is comprised of a plurality of relatively large diameter tension wires wound around an optical fiber unit in a close fitting manner so as to form a single layer which acts as a tension body, and root portions between the first tension wires caused by winding the first tension wires which covered by relatively small diameter second tension wires. Due to the second tension wires, deformation of the tension body of the stranded wires can be prevented and the pressure resistance and the tensile strength can be improved.

2 Claims, 2 Drawing Sheets

SUBMARINE OPTICAL FIBER CABLE

BACKGROUND OF THE INVENTION

This invention relates to a submarine optical fiber cable which is suitable for use as an optical fiber cable laid at relatively shallow depths below the surface of the sea.

In general, submarine optical fiber cables are designed to exhibit mechanical properties whereby the tensile strength is in excess of 10 ton.f and the cable modulus (cable breaking tension versus cable weight in water) exceeds 20 km so that the cable can be laid to depths of 5000 m or more and recovery and maintenance work on the cable can be performed.

A conventional submarine optical fiber cable of the type described above is shown in FIGS. 2 and 3.

In FIG. 2, reference numeral 1 represents an optical fiber unit in which a plurality of core optical fibers are included, iron segments 2 that divide the circumference of the optical fiber unit 1 into three pieces are provided around the same, and a plurality of steel wires 3 are wound in a close fitting manner around the outer surfaces of the iron segments 2 that divide the circumference of the optical fiber unit 1 into three pieces. Reference numeral 4 represents a copper tube which is formed in such a manner as to surround the circumference of the steel wires 3. Reference numeral 5 represents a sheath.

In this conventional example, two layered structures formed by the steel wires 3 and the iron segments 2 that divide the circumference of the optical fiber unit 1 into three pieces together improve the pressure resistance and the tensile strength.

In FIG. 3, three different diameter steel wires 12a, 12b and 12c are wound around the optical fiber unit 11 in a close fitting manner to form two layers. Provided around this is a copper tube 13 and a sheath 14.

In this case too the two-layered tension body is formed by the steel wires 12a, 12b and 12c.

In the above-described conventional examples, the dimensions and materials thereof are, of course, designed to obtain the mechanical characteristics described above.

A submarine optical fiber cable with the same type of structure is conventionally used at any depth below the sea surface. However, since such an optical fiber cable is usually designed to be able to withstand conditions at a depth of 5000 m or more, the performance exceeds by a considerable extent what is required in a case where the cable is laid at a shallow depth and use of such expensive cable in such location is thus uneconomical. Furthermore, since a cable of the type described above has a relatively large diameter, a great quantity of armoring materials need to be used if armoring is required. The large diameter and heaviness of the cable also lead to costly installation and transportation budgets.

For the above-described reasons, an economical submarine optical fiber cable for use at a shallow depth below the sea surface is required.

One example of such a structure is formed in such a manner that the iron segments 2, dividing the circumference of the optical unit 1 into three pieces, are omitted from the cable structure shown in FIG. 2, and another example involves omitting from the cable structure shown in FIG. 3, the steel wires 12b and 12c that form the second layer.

However, a cable with only one layer of steel wire wound directly around the optical fiber unit displays a very unstable stranded structure. Specifically, if the optical fiber unit should happen to be directly subjected to a lateral pressure during manufacture, the strength of the core optical fibers would be reduced. Consequently, a reliable submarine optical fiber cable cannot be obtained in this way.

On the other hand, another method could be employed in which the diameter of the cable is reduced by adopting smaller dimensions compared with the conventional cable structure. However, this would also lead to the diameter of the optical fiber unit being reduced. This raises problems in the sense that the number of optical fibers to be installed is necessarily limited and the mechanical properties of the optical fiber unit cannot be maintained at the required level.

SUMMARY OF THE INVENTION

Therefore, an object of the present invention is to provide an optical fiber cable having a structure which is suitable for use as a submarine optical fiber cable at shallow depth.

Accordingly, a submarine optical fiber cable according to the present invention comprises: an optical fiber unit; a plurality of relatively large diameter first tension wires wound around the optical fiber unit in a close fitting manner so as form a single layer and to serve as a tension body; and relatively small diameter second tension wires wound so as to cover the root portions between the first tension wires formed by winding the first tension wires.

By arranging the relatively small diameter of the second tension wires to be suitable for allowing the second tension wires to cover the root portions formed between the first tension wires, the stranded structure (strand which serves as a tension body) of the first tension wires can be made stable, and a sufficiently strong shell effect that will protect the optical fiber unit can be obtained.

Further, according to the fiber cable of the present invention, the diameter of the cable can be reduced without reducing the diameter of the fiber unit.

DETAILED DESCRIPTION OF A PREFERRED EMBODIMENT

An embodiment of the present invention will now be described in detail with reference to the accompanying drawings. It is to be understood that the present invention is not limited to this embodiment.

Figure 1:
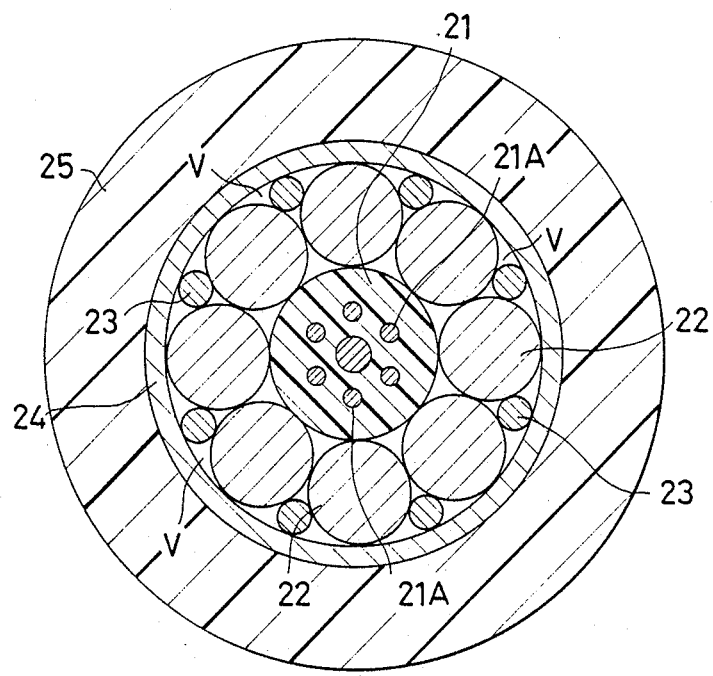
FIG. 1 is a cross-sectional view illustrating an embodiment of the present invention.

FIG. 1 illustrates an embodiment of the present invention.

In this drawing, reference numeral 21 represents an optical fiber unit constituted in such a manner that a plurality of core optical fibers 21A are stranded and packed together using an ultraviolet setting resin or thermoplastic resin. Reference numeral 22 represents first tension wires which are wound around the optical fiber unit 21 and which are formed of steel wires having a relatively large diameter. In this embodiment eight steel wires (22) are wound around the optical fiber unit 21 so as to form a single-layered tension body.

Reference numeral 23 represents second tension wires also formed of steel wires having a relatively small diameter, and these are wound in such a manner as to be fitted within the root portions formed when winding the first tension wires 22 around the optical fiber unit 21.

Provided around the stranded body formed by the first tension wires 22, that is, the tension body, is a copper tube 24, and a polyethylene sheath 25 is formed around the outermost portion thereof.

It is preferable for the diameter of the second tension wire 23 to be so determined such that the total outer diameter of the tension wires 23 the same as the circumference (equivalent to the inner circumference of the copper tube 24) of the circle circumscribing the stranded body of the first tension wires 22 after the second tension wires 23 have been wound around the root portions.

Figure 2:
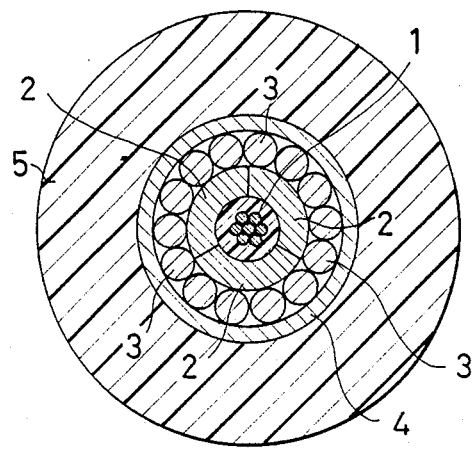
FIG. 2 is a cross-sectional view illustrating a conventional submarine optical fiber cable.
Figure 3:
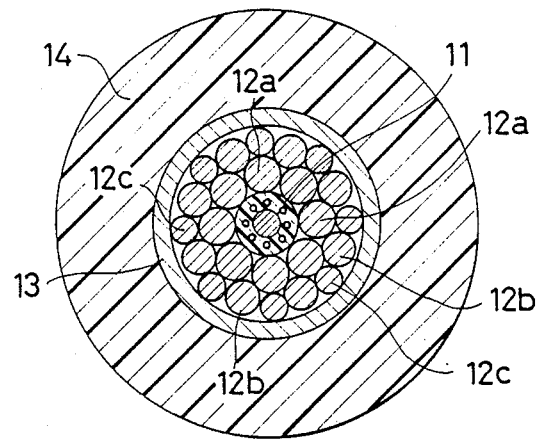
FIG. 3 is a cross-sectional view illustrating another conventional submarine optical fiber cable.

As described above, since the cable according to the present invention is constituted in such a manner that the outer diameter of the twined body formed by winding the first tension wires 22 around the optical fiber unit 21 is the same as the outer diameter of the tension body, a cable with a diameter that is significantly reduced in comparison with the conventional cables (see FIGS. 2 and 3) that employ a two-layered tension body can be manufactured.

Furthermore, the second tension wires 23 that are wound around the root portions formed on the outer surface of the twined body of the first tension wires 22 act to prevent any deformation of the stranded shape due to movement of the first tension wires 22 even if a shock or excessive bending stress is applied thereto. As a result of this, the stranded structure of the tension body can be adequately stabilized (the optical fiber unit can be protected against adverse effects due to lateral pressure). Therefore, sufficient tensile strength can be obtained even though the diameter is only the same as that of a single layered tension body.

Since a stranded body with a relatively small diameter compared to the conventional two-layered structure can thus be achieved, the individual first tension wires 22 can be enlarged in diameter to a certain degree. As a result of this enlarged diameter, an even stronger shell effect (contact sealing effect produced by the steel wires 22) can be obtained in respect of each of the first tension wires 22. Consequently, the ability to protect the optical fiber unit 21 against the action of hydraulic pressure can be improved.

Specific design dimensions for the embodiment of the present invention may be exemplified as follows:

Optical fiber unit (21) ... $\phi$ 3.3 mm
First tension wires (22) ... $\phi$ 2.1 mm × 8 wires
Second tension wires (23) ... $\phi$ 0.7 mm × 8 wires
Copper tube (24) ... $\phi$ 8.4 mm
Sheath (25) ... $\phi$ 17 mm,
(wherein symbol $\phi$ represents outer diameters).

As a result of the above-described dimensions designed, for example, an optical fiber cable having a cable tensile strength of 6 ton.f or more and a cable modulus of 20 km or more was obtained. That is, the submarine optical fiber cable has the sufficient performance for use at a relatively shallow sea bottom.

Therefore, if a submarine optical cable having a structure of the type described above is used as the shallow sea bottom cable, problems in performance with respect to a conventional cable (a cable which can be laid over a depth of 5000 m or more) do not occur. Furthermore, significant economical benefits can be obtained in which costs needed for armoring work, transportation and installation can be reduced, the workability can be improved and the necessary materials can be reduced.

The steel wires 22, 23 and the copper tube 24 can be used as a power feeding path to the repeater and also are used as low frequency signal injecting lines which are used at the cable fault location.

The material of the second tension wires 23 may be copper or aluminum. In this case, the signal conducting resistance can be further reduced. Furthermore, the sinking involved by the copper tube 24 can make the fitness within the root portions easy.

As described above, according to the submarine optical fiber cable according to the present invention, an effect can be obtained in which the deformation of the stranded body of the tension body formed by the first tension wires can be prevented and its shape can be stabilized. Furthermore, a further pressure resistance and a tensile strength can be obtained. Since the structure of the submarine optical fiber cable can be formed simply, an effect can be obtained in which it can be readily manufactured by means of a conventional cable manufacturing device.

What is claimed is:

1. A submarine optical fiber cable comprising:
an optical fiber unit;
a plurality of large uniform diameter first tension wires wound around said optical fiber unit in a close fitting manner so as to form a single layer having a thickness substantially equal to the diameter of said first tension wires and to serve as a tension body; and
a plurality of small uniform diameter second tension wires wound around said single layer such that each of said second tension wires contacts adjacent first tension wires of said single layer.

2. The submarine optical fiber cable of claim 1, wherein said second tension wires comprise copper wires and aluminum wires.

* * * * *